US007779480B2

(12) United States Patent (10) Patent No.: US 7,779,480 B2
Verbowski et al. (45) Date of Patent: Aug. 17, 2010

(54) IDENTIFYING DEPENDENCIES OF AN APPLICATION UPON A GIVEN SECURITY CONTEXT

(75) Inventors: Chad E Verbowski, Redmond, WA (US); John D. Dunagan, Sammamish, WA (US); Shuo Chen, Urbana, IL (US); Yi-Min Wang, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1386 days.

(21) Appl. No.: 11/214,125

(22) Filed: Aug. 29, 2005

(65) Prior Publication Data

US 2007/0006283 A1 Jan. 4, 2007

Related U.S. Application Data

(63) Continuation-in-part of application No. 11/172,579, filed on Jun. 30, 2005, now abandoned.

(51) Int. Cl.
*G06F 21/00* (2006.01)
*G06F 17/30* (2006.01)
(52) U.S. Cl. .......................... 726/27; 726/26; 713/167
(58) Field of Classification Search ............... 726/2, 726/9–10, 16, 27–30, 26; 713/164–165, 713/167, 176, 182, 193, 200; 707/9; 709/200, 709/203; 705/1, 54
See application file for complete search history.

(56) References Cited

U.S. PATENT DOCUMENTS

| 6,308,274 | B1 * | 10/2001 | Swift | 726/9 |
| 7,299,382 | B2 * | 11/2007 | Jorapur | 714/38 |
| 7,363,275 | B2 * | 4/2008 | Kojima et al. | 705/54 |
| 2002/0099952 | A1 * | 7/2002 | Lambert et al. | 713/200 |
| 2005/0119902 | A1 * | 6/2005 | Christiansen | 705/1 |
| 2005/0262478 | A1 * | 11/2005 | Barnes et al. | 717/118 |
| 2005/0262487 | A1 * | 11/2005 | Pistoia et al. | 717/143 |
| 2006/0288261 | A1 * | 12/2006 | Yuan et al. | 714/48 |

OTHER PUBLICATIONS

Tomas Restrepo, "Adjusting Process Token Privileges", http://winterdom.com/dev/security/tokens.html, 2002.*
J. R. Lorrch and A. J. Smith, The VTrace Tool: Building a System Tracer for Windows NT and Windows 2000, MSDN Magazine, Oct. 2000.*
Insung Park, "Event Tracing for Windows: Best Practices," CMG, http://www.cmg.org/proceedings/2004/4188.pdf, 2004.*
Niels Provos, Markus Friedl, and Peter Honeyman, "Preventing Privilege Escalation", http://www.citi.umich.edu/u/provos/papers/privsep.pdf. 2003.*

(Continued)

*Primary Examiner*—Carl Colin
*Assistant Examiner*—Hee Song
(74) *Attorney, Agent, or Firm*—Lee & Hayes, PLLC (57) ABSTRACT

A technique for identifying dependencies of an application upon a given security context includes monitoring security checks generated by the application. The security checks requiring elevated rights are identified and the state of execution of the application corresponding to the identified security checks may be logged. The security checks requiring elevated rights may be identified by monitoring access checks, monitoring privilege checks, checking user/group identifiers against a list of known identifiers associated with elevated rights, or the like.

11 Claims, 9 Drawing Sheets

OTHER PUBLICATIONS

Microsoft TechNet, "How Security Descriptors and Access Control Lists Work,", http://technet.microsoft.com/en-us/library/cc781716.aspx. Mar. 2003.*

Microsoft TechNet, "How Access Tokens Work," http://technet.microsoft.com/en-us/library/cc783557.aspx. Mar. 2003.*

Lim Bio Liong, "NT Remote and Local Group and User Account SID Collector Tool", htp://www.codeproject.com/KB/applications/collectsid.aspx, Dec. 2001.*

EntireX, "Security Functions", https://cis.tamu.edu/systems/database/manuals.exx611/dcom/secfun.htm. 2000.*

Toms Restrepo, "Adjusting Process Token Privilesges," http://winterdom.com/dev/security/tokens.html, 2002.*

J. R. Lorch and A. J. Smith, "The VTrace Tool: Building a System Tracer for Windowns NT and Windows 2000," MSDN Magazine, Oct. 2000.*

Insung Park, "Event Tracign for Windows: Best Practices," CMG, http://www.cmg.org/proceedings/2004/4188.pdf, 2004.*

Microsoft TechNet, "How Access Tokens Work," http://technket.microsoft.com/en-us/library/cc783557.aspx. Mar. 2003.*

EntireX, "Security Functions," https://cis.tamu.edu/systems/database/manuals.exx611/dcom/secfun.htm. 2000.*

EntireX, "Security Functions", htps://cis.tamu.edu/systems/database/manuals.exx611/dcom/secfun.htm, 2000.*

"How Access Tokens Work", Microsoft TechNet, retrieved on Jan. 29, 2009 at <<http://technet.microsoft.com/en-us/library/cc7835537.aspx>>, Mar. 2003, 10 pages.

"How Security Descriptors and Access Control Lists Work", Microsoft TechNet, retrieved on Jan. 29, 2009 at <<http://technet.microsoft.com/en-us/library/cc781716.aspx>>, Mar. 2003, 19 pages.

Insung Park, "Event Tracing for Windows: Best Practices", retrieved on Jan. 30, 2009 at <<http://www.cmg.org/ proceedings/2004/4188.pdf>>, 2004, 11 pgs.

Lorch, et al., "The VTrace Tool: Building a System Tracer for Windows NT and Windows 2000", MSDN Magazine, Oct. 2000, 10 pgs.

Provos, et al., "Preventing Privilege Escalation", retrieved on Jan. 29, 2009 at <<http://www.citi.umich.edu.u/provos/papers/privsep.pdf>>, 2003, pp. 1-11.

Wang, et al., "Strider: A Black-box, State-based Approach to Change and Configuration Management and Support", USENIX LISA, 2003, pp. 165-178.

Acharya et al, "MAPbox: Using Parameterized Behavior Classes to Confine Untrusted Applications", Proceedings of USENIX Security Symposium, Aug. 2000, 18 pgs.

"AOL Instant Messenger Client for Windows Contains a Buffer Overflow while Parsing TLV 0x271 1 Packets", US-Cert, Vulnerability Note, retrieved Aug. 13, 2009 at http://www.kb.cert.org/vuls/id/907819, 2 pgs.

Ashcraft et al, "Using Programmer-Written Compiler Extensions to Catch Security Holes", Proc 2002 IEEE Symposium on Security and Privacy, 2002, 17 pgs.

Ball, "Abstraction-Guided Test Generation: A Case Study", Microsoft Research Technical Report, MSR-TR-2003-86, Nov. 2003, 16 pgs.

Brown, "Keith's Security Hall of Shame", retrieved Aug. 13, 2009 at http://alt.pluralsight.com/wiki/Print.aspx/Keith.Hallofshame, available as early as Jan. 27, 2005, 4 pgs.

Brumley et al, "Privtrans: Automatically Partitioning Programs for Privilege Separation", 13th USENIX Security Symposium, 2004. 15 pgs.

Carson, "Sendmail without the Superuser", Proc 4th USENIX UNIX Security Symposium, Oct. 1993, retrieved Aug. 13, 2009 at http://www.usenix.org/publications/library/proceedings/sec4/full_papers/carson, 7 pgs.

"CERT Advisory CA-2004-02 Email-borne Viruses", retrieved Aug. 13, 2009 at http://www.cert.org/advisories/CA-2004-02. html, Jan. 2004, 5 pgs.

Chen et al, "Setuid Demystified", Proc 11th USENIX Security Symposium, 2002, 20 pgs.

Cowan et al, "SubDomain: Parsimonious Server Security", LISA 2000, Proc 14th USENIX Conf on System Administration, retrieved Aug. 13, 2009 at http://www.usenix.org/events/lisa00/full_papers/cowan/cowan_html, Dec. 2000, pp. 355-368.

Evans, "Very Secure FTP Daemon vsftpd", retrieved Aug. 13, 2009 at http://vsftpd.beasts.org, available as early as Mar. 2002, 4 pgs.

Garfinkel et al, "Ostia: A Delegating Architecture for Secure System Call Interposition", NDSS 2004, Proc. Network and Distributed Systems Security Symp., Feb. 2004, 15 pgs.

Garfinkel et al, "Terra: A Virtual Machine Based Platform for Trusted Computing", ACM SIGOPS Operating Systems Review, SOSP 2003, 14 pgs.

Garfinkel, "Traps and Pitfalls: Practical Problems in System Call Interposition Based Security Tools", NDSS 2003, 14 pgs.

Gotlieb et al, "Automatic Test Data Generation Using Constraint Solving Techniques", In Proceedings of the International Symposium on Software Testing and Analysis, ACM, 1998, 10 pgs.

GUI, "Debugging Permissions Problems", Mar. 2001, retrieved Aug. 13, 2009 at http://web.archives.org/web/20020925195828/http://msdn.microsoft.com/library/en-us/dnas, 3 pgs.

Howard et al, "Measuring Relative Attack Surfaces", Proceedings of Workshop on Advanced Developments in Software and Systems Security, Dec. 2003, Also CMU-CS-03-169 Technical Report, Aug. 2003, 24 pgs.

National Cyber Alert System, "Internet Explorer Update to Disable ADODB.Stream ActiveX Control", Technical Cyber Security Alert TA04-184A, Jul. 2004, retrieved Aug. 14, 2009 at http://www.us-cert.gov/cas/techalerts/TA04-184A.html, 3 pgs.

Jackson et al, "Finding Bugs with a Constraint Solver", In Proceedings of the International Symposium on Software Testing and Analysis, ACM, 2000, 12 pgs.

Loscocco et al, "Meeting Critical Security Objectives with Security-Enhanced Linux", In the Proceedings of the 2001 Ottawa Linux Symposium, Jul. 2001, 11 pgs.

Microsoft, "Certain Programs Do Not Work Correctly If You Log on Using a Limited User Account", Mar. 2005, retrieved Aug. 14, 2009 at http://support.microsoft.com/default.aspx?scid=kbenus307091, 5 pgs.

Microsoft, "Retrieving the Properties of a Connection (VBScript)", retrieved Aug. 31, 2009 at http://msdn.microsoft.com/library/aa366335(VS.85.printer).aspx, available at least as early as Feb. 2005, 2 pgs.

Oetiker, "MSI Packaging How-To", Real Men Don't Click, retrieved Aug. 14, 2009 at http://isg.ee.ethz.ch/tools/realmen/det/msi.en.html, May 2001, 7 pgs.

Proctor, "Hardening Windows NT Against Attack", WindowSecurity.com, Oct. 2002, retrieved Aug. 14, 2009 at http://www.windowssecurity.com/whitepapers/Hardening_Windows_NT_Against_ Attack_html, 5 pgs.

Provos, "Improving Host Security with System Call Policies", 12th USENIX Security Symposium, 2003, 15 pgs.

Provost, "Non-Admin Development in VS.NET 2003", Nov. 2004, retrieved Aug. 14, 2009 at http://www.peterprovost.org/blog/post/Non-Admin-Development-in-VSNET2003.aspx, 2 pgs.

Rhodes, "Chapter 15: Mandatory Access Control", FreeBSD Handbook, retrieved Aug. 13, 2009 at http://www.freebsd.org/doc/enUS.ISO8859-1/books/handbook/mac.htmlciteseer.nj .nec.com/ganesh03peertopeer.html, available at least as early as Feb. 2005, 30 pgs.

Saroiu et al, "Measurement and Analysis of Spyware in a University Environment", NSDI 2004 Technical Paper, Mar. 2004, 11 pgs.

Toups, "Administrator Privileges for Turbo Tax?!?!", Braodband DSLReports.com, retreived Aug. 13, 2009 at http://www.justbroadband.org/forum/remark.9732454, Nov. 2001, 8 pgs.

"US-Cert Technical Cyber Security Alert TA04-212A—Critical Vulnerabilities in Microsoft Windows" Jul. 2004, retrieved Aug. 13, 2009 at http://www.us-cert.gov/cas/techalerts/TA04-212A.html, 4 pgs.

Venema, "Postfix Overview-Introduction", retrieved Aug. 13, 2009 at http://web.archives.org/web/20000821002130/http://www.postfix.org/motivation.html, available at least as early as Aug. 2000, 1 pgs.

Wang et al, "Gatekeeper: Monitoring Auto-Start Extensibility Points (ASEPs) for Spyware Management", In Proceedings of Usenix LISA, Nov. 2004, pp. 33-46.

Yang et al, "MECA: an Extensible, Expressive System and Language for Statically Checking Security Properties", ACM CCS, Oct. 2003, 14 pgs.

* cited by examiner

IDENTIFYING DEPENDENCIES OF AN APPLICATION UPON A GIVEN SECURITY CONTEXT

CROSS-REFERENCE TO RELATED APPLICATIONS

This is a continuation-in-part of application Ser. No. 11/172,579 filed Jun. 30, 2005.

BACKGROUND

A substantial number of users of the Windows® operating system run as members of the Administrator group all of the time. Generally, a user runs as a member of the Administrators group (commonly referred to as "running as Admin," "having Administrative access rights" or "having Administrative privileges") to ensure that they have access to all of the files and resources required to run each and every application they may use. However, the possession of administrative rights by users significantly increases the vulnerability of the computing devices. Because any application started runs with the security context of the user that started it, running with Administrative access rights means that every application will have Administrative access rights. Thus every application will have the ability to use any resource in the system, and access any persistent state. This is a security risk because it allows malicious software, such as a network worm or virus, that attacks and overtakes a running program to then access any persistent state and use any resource. Accordingly, simply compromising a user network service, such as an instant messaging client, provides an attacker complete control of the system. The security threat is both acute and widespread. For example, attacks against user level networking applications are common and include spyware, self-propagating email, web browser exploits, instant messaging (IM) client exploits and the like.

Unfortunately, a significant number of common applications require elevated access rights, even though most of them could accomplish their goals through some other means that did not require the elevated rights. Accordingly, the proliferation of applications that unnecessarily require elevated access rights further motivates users to run with administrative privileges all of the time. In addition, applications that unnecessarily require elevated rights but are run without such rights often fail with misleading error messages. Thus, users without elevated access rights spend more time troubleshooting. Furthermore, the number of applications that are dependent upon elevated rights is sufficiently great that starting each one from a separate user account with such access rights, or setting up scripts to do this semi-automatically, is a significant inconvenience.

One method of investigating an application's dependency upon a given security context involves setting breakpoints and stepping through execution of the code to determine where security checks fail when the entity does not belong to a particular privileged group, such as an administrator group, network administrator group, domain administrator group, or the like. However, the process of setting breakpoints and stepping through code relies upon a high degree of intuition and trial and error, and is typically prohibitively time consuming. In addition, most individuals, such as information technology (IT) personnel and third-party developers, do not have access to the source code to facilitate analysis.

Other methods include tracing access to the computer objects that are being secured, of which file tracing and registry tracing are two common examples. However, these are limited in the scope of problems they detect, and the overall investigation is often still quite time-consuming. Furthermore, the conventional methods typically determine dependencies upon a given security context one incompatibility at a time, which again increases the time required to resolve problems.

SUMMARY

The techniques described herein are directed toward identifying an application's dependency upon a given security context. Identifying the dependency upon the given security context includes monitoring security checks generated by the application and identifying those security checks that succeed with elevated rights and fail without such rights. The techniques may include determining causes of access right incompatibilities, determining causes of privilege incompatibilities, determining causes of user/group comparison incompatibilities and/or the like.

Determining causes of access right incompatibilities includes monitoring the results of access checks submitted with a given set of security identifiers. Access checks that succeed are re-submitted with a subset of the original security identifiers. The results of the re-submitted access checks are monitored and the state of execution of the application is logged if the particular re-submitted access check fails. The determination of the access right incompatibilities may be validated by running the application with the subset of security identifiers and intercepting access checks that correspond to a logged event. The intercepted access checks are modified to include the original set of security identifiers and execution of the application is monitored. The application will only run correctly if all the access right incompatibility events were determined and modified to support the required access.

Determining causes of privilege incompatibilities includes monitoring the results of privilege checks submitted with a given set of privileges. Privilege checks that succeed are re-submitted with a subset of the original privileges. The results of the re-submitted privilege checks are monitored and the state of execution of the application is logged if the particular re-submitted privilege check fails. The determination of the privilege incompatibilities may be validated by running the application with the subset of privileges and intercepting privilege checks that correspond to a logged event. The intercepted privilege checks are modified to include the original set of privileges and execution of the application is monitored. The application will only run correctly if all the privilege incompatibility events were determined and modified to support the required access.

Determining causes of user/group comparison incompatibilities includes inserting a jump before a direct call to a function that compares user/groups identifiers directly. Upon execution of the jump, the user/group identifiers are checked against known identifiers associated with privileged groups granting elevated rights, such as the Administrators group. If any of the user/group identifiers are known to be associated with a privileged group the state of execution of the application is logged.

Each dependency upon a given security context may be determined during a single trace of the application's execution. In addition, it is appreciated that the security checks are a tiny fraction of a system's performance. Thus the overhead added by the techniques, which in the worst case is proportional to duplicating all security checks, is negligible.

BRIEF DESCRIPTION OF THE DRAWINGS

Embodiments are illustrated by way of example and not by way of limitation, in the figures of the accompanying drawings and in which like reference numerals refer to similar elements and in which.

DETAILED DESCRIPTION OF THE INVENTION

Techniques are described herein for identifying the reasons an application requires a given security context. Accordingly, the techniques advantageously assist developers to fix least-right incompatibilities. The techniques can also be utilized by system administrators to mitigate the impact of least-rights incompatibilities in the near term through local system policy changes.

Figure 1:
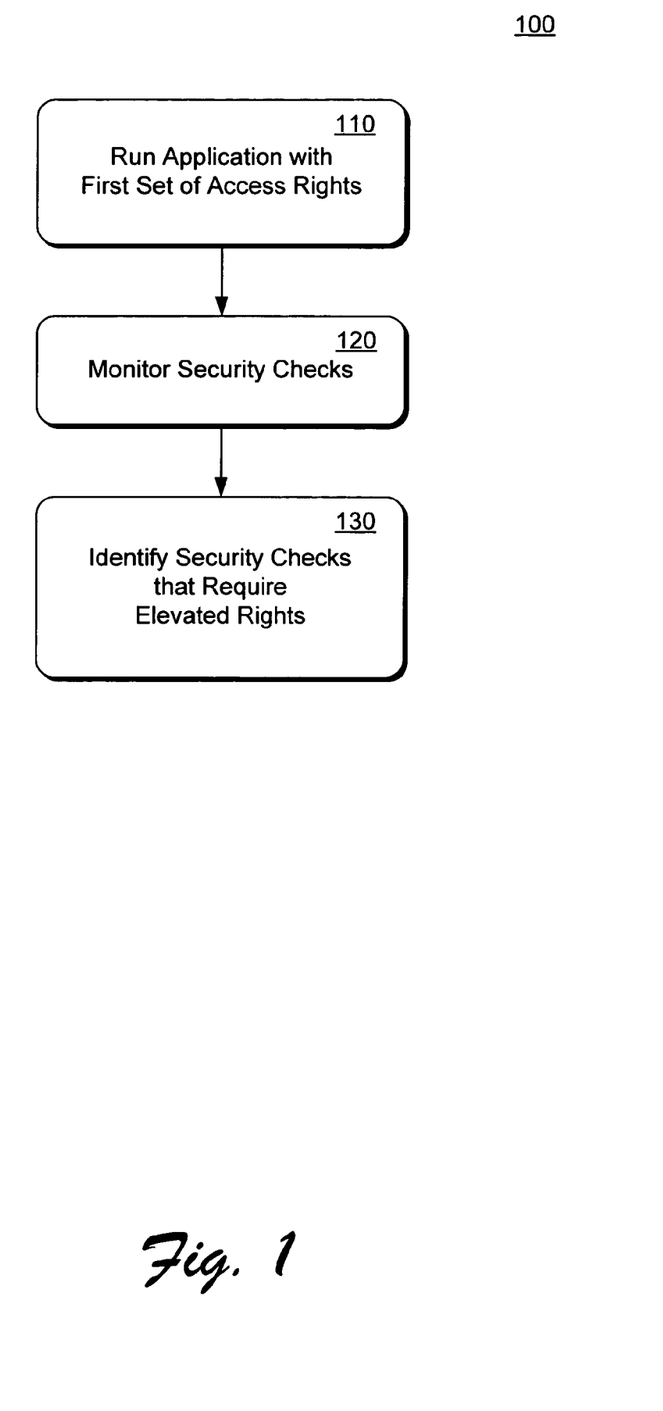
FIG. 1 shows a flow diagram of a method of identifying dependencies of an application upon a given security context.

FIG. 1 shows an exemplary method 100 of identifying an application's dependency upon a given security context. The method 100 includes running an application having a given security context, at 110. The security context is an instance of a user having a particular subset of security parameters. The security checks generated by the application are monitored, at 120. At 130, the security checks that require elevated rights are identified. The elevated rights may correspond to security identifiers (SID), privileges, or the like, that are associated with a privileged user such as an administrator group, network administrator group, domain administrator group, local administrator group, backup operators group, supervisory group, power user group, privileged user group, root or super-user (terms common in the Unix setting), or the like.

Figure 2:
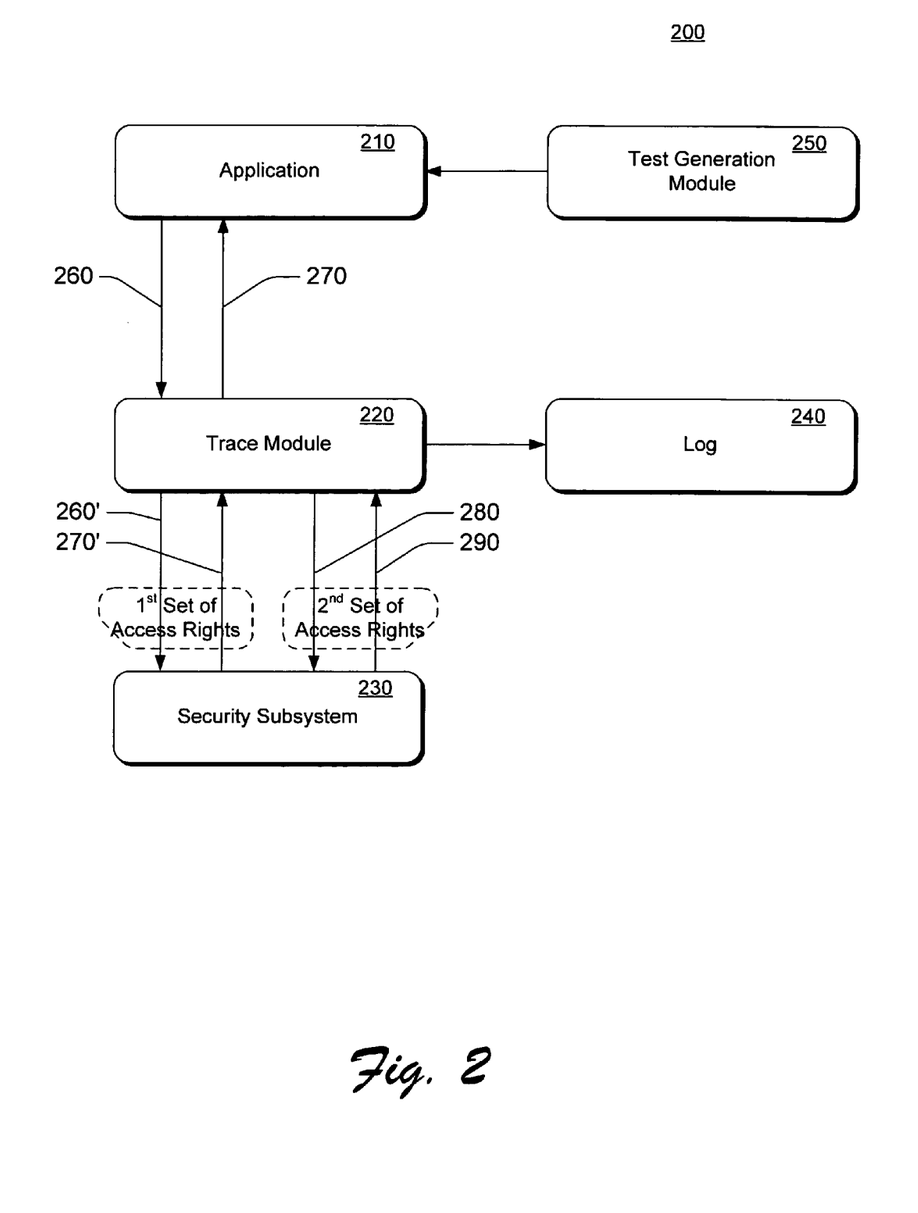
FIG. 2 shows a block diagram of a system for determining dependencies of an application upon a given security context.

For discussion purposes, the method 100 of identifying an application's dependency upon a given security context is further described herein with reference to an exemplary system 200, shown in FIG. 2. However, it is appreciated that the method 100 may be practiced independently of the illustrated system 200. The method 100 may be implemented by some or all of the functional elements of the system 200 and/or various combinations of the functional elements. Likewise, the system 200 for determining the dependency of an application upon a given security context may be implemented independently of the illustrated method 100. The system 200 may implement some or all of the processes of the method 100, in various combinations and/or in various orders.

The system 200 for determining the dependency of an application 210 upon a given security context includes a trace module 220, a security subsystem 230 and a log 240. The trace module 220 is communicatively coupled between the application 210 the security subsystem 230 and the log 240.

The system 200 may further include a test generation module 250 for controlling execution of the application 210 to achieve a desired level of code coverage. The test generation module 250 may be utilized to exercise all the routines of the application 210 or a select set of routines of the application 210.

The trace module 220 is adapted to monitor security checks 260 generated by the application 210 and identify those security checks that require elevated rights 210. The trace module 220 may also be adapted to store a state of execution of the application 210 in the log 240 if a particular security check requires elevated rights. Monitoring security checks 260 generated by the application 210 and identifying security checks that require elevated rights may include: a) monitoring access checks performed by the security subsystem; b) monitoring privilege checks performed by the security subsystem; and/or c) checking user/group identifiers, which an application compares directly, against a list of known identifiers associated with elevated rights.

Figure 3:
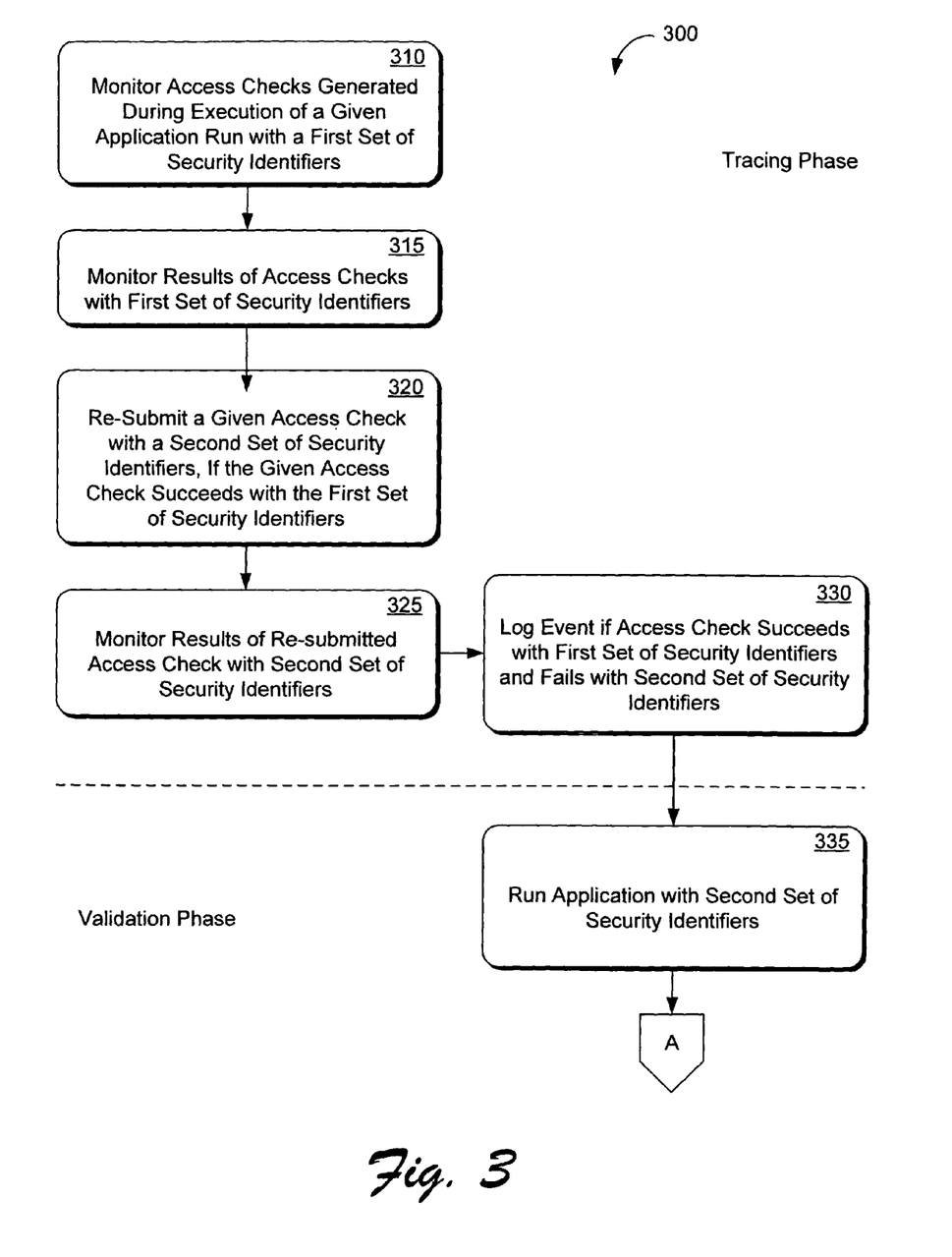
FIGS. 3 and 4 show a flow diagram of a method of identifying causes of access right incompatibilities.
Figure 4:
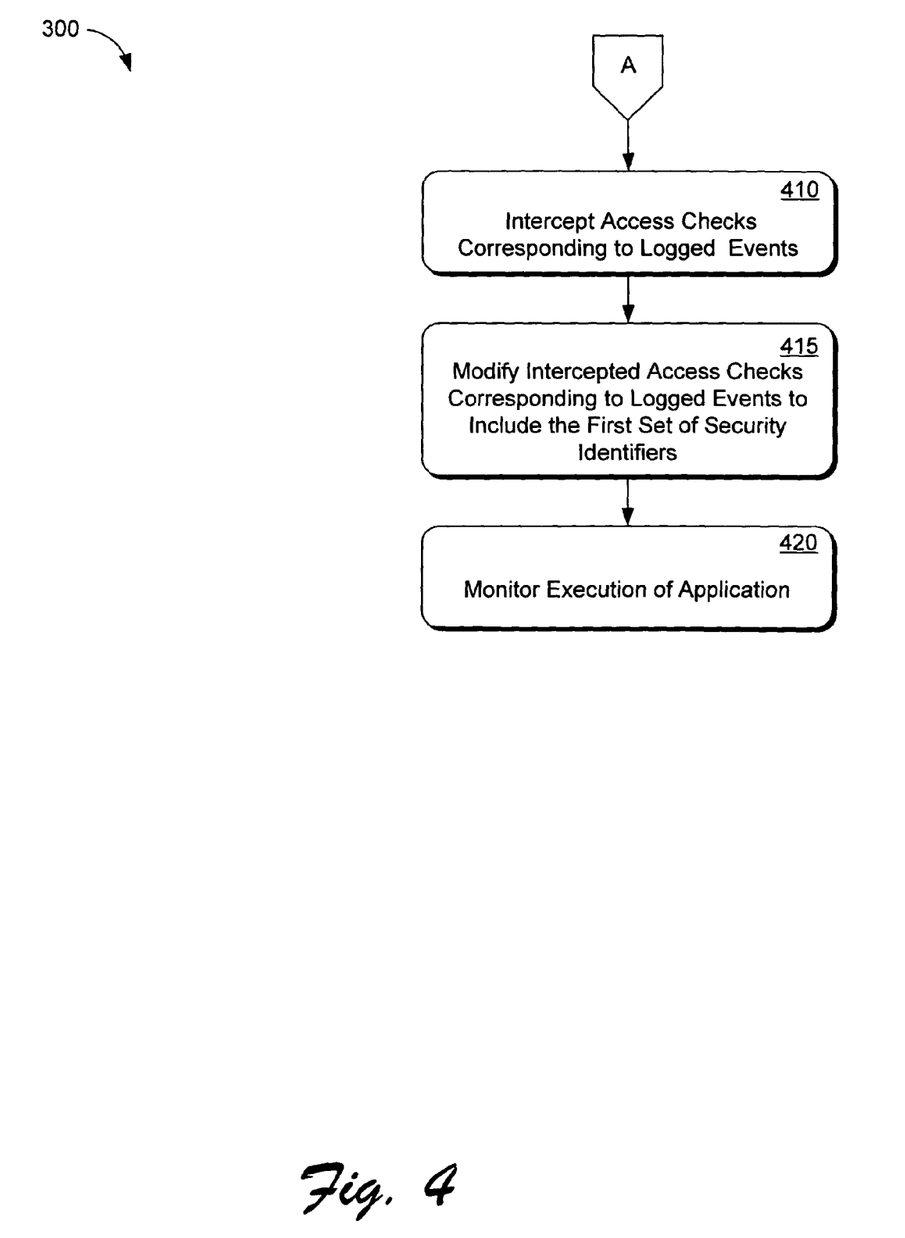

FIGS. 3 and 4 show a method 300 of monitoring access checks performed by the system 200. The method 300 includes a tracing phase and may also include a validation phase. During the tracing phase, the application 210 has a given security context. In particular, the security context of a process of the executing application 210 may be embodied in a token that includes a set of security identifiers (SIDs). At 310, access checks made during execution of the application are monitored. For example, when an object is accessed (e.g., open, save, execute or the like) the trace module 220 intercepts the token of the access checks 260. The trace module 220 allows the token of the original access check to pass through unmodified 260' to the security subsystem 230. The token of the original access check 260' indicates that the security context includes a first set of SIDs. The security subsystem 230 compares the SIDs in the token to an access control list (ACL) associated with the object. If any SID matches a positive entry in the access control list (an allow ACE), and none of the SIDs match a negative entry (a deny ACE), the security subsystem 230 indicates 270' that the one or more actions specified in the particular access control entry may be performed on the associated object.

At 315, the results of the access checks having a first set of security identifiers are monitored. If a particular security check succeeds with the first of set security identifiers, the trace module 220 re-submits the access check 280 with a second set of security identifiers, at 320. For example, the trace module 220 modifies the token of the intercepted access check 260 to contain a second set of SIDs that is a subset of the first set of SIDs. In one implementation, at least one SID associated with a privileged group is removed from the first set of security identifiers to form the second set. The access check is re-submitted 280 with the second set of SIDs. The security subsystem 230 compares the SIDs, contained in the token of the re-submitted access check 280, to the access control list associated with the object. If any SID matches some positive entry in the ACL, and none of the SIDs match a negative entry, the security subsystem 230 indicates 290 that the one or more actions specified in the particular access control entry may be performed on the associated object.

At 325, the results 290 of the re-submitted access checks 280 having the second set of security identifiers are monitored. If a given access check succeeds with the first set of security identifiers and the modified access check fails with the second set of security identifiers, the event is logged, at 330. Each entry in the event log 240 may include the current process name, the monitored security checking function, the desired access and granted access, a stack dump, the object name and/or other parameters of the current state of execution of the application 210.

During the optional validation phase, the method 300 may include executing the application with the second set of security identifiers, at 335. Each access check corresponding to a particular logged event is intercepted, at 410, and modified to include the first set of security identifiers, at 415. Execution of the application is monitored, at 420. The application will run correctly if all of the access right incompatibility events have been identified. Thus, by performing the validation phase one can ensure that all security checks causing access right incompatibilities have been identified.

Figure 5:
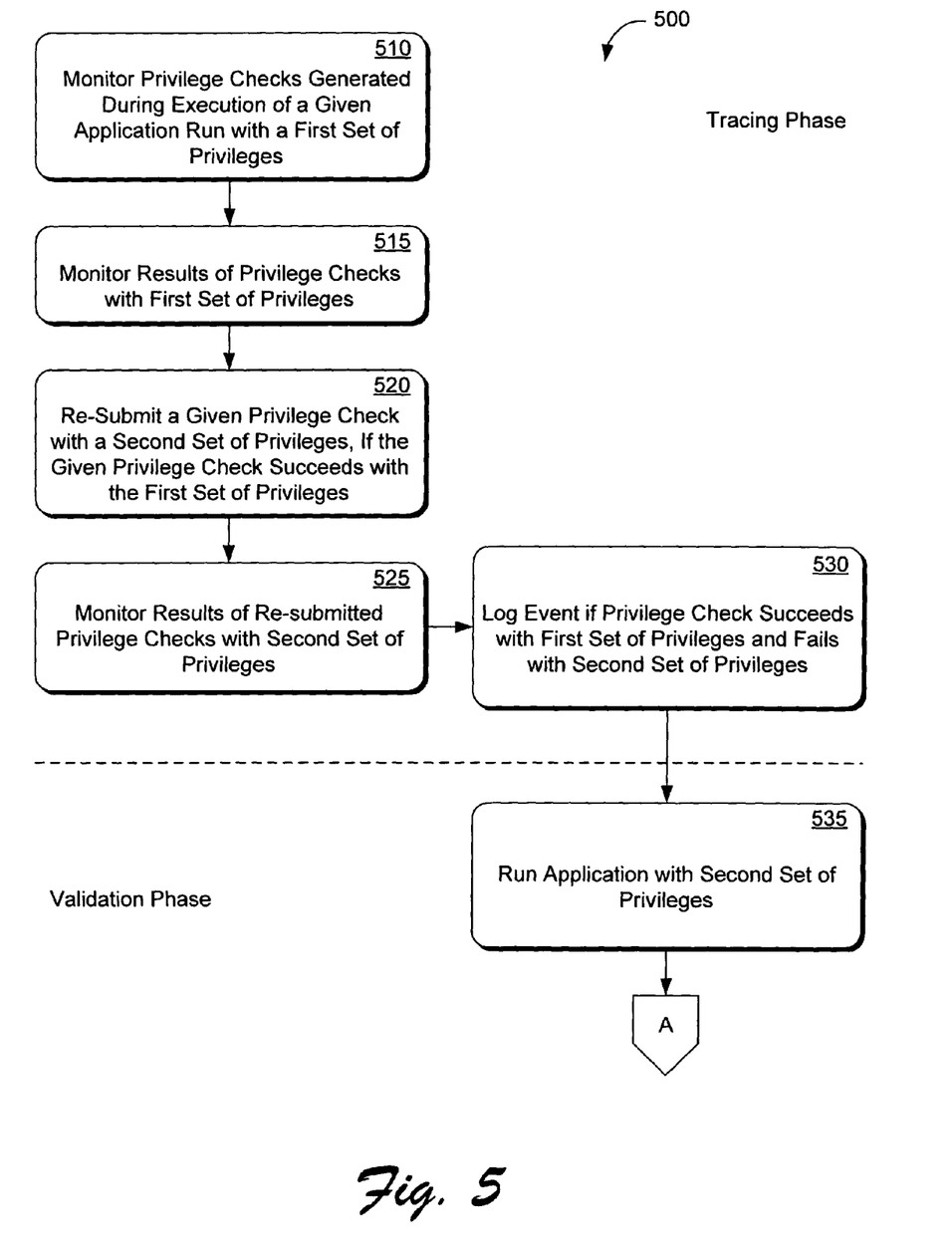
FIGS. 5 and 6 show a flow diagram of a method of identifying causes of privilege incompatibilities.
Figure 6:
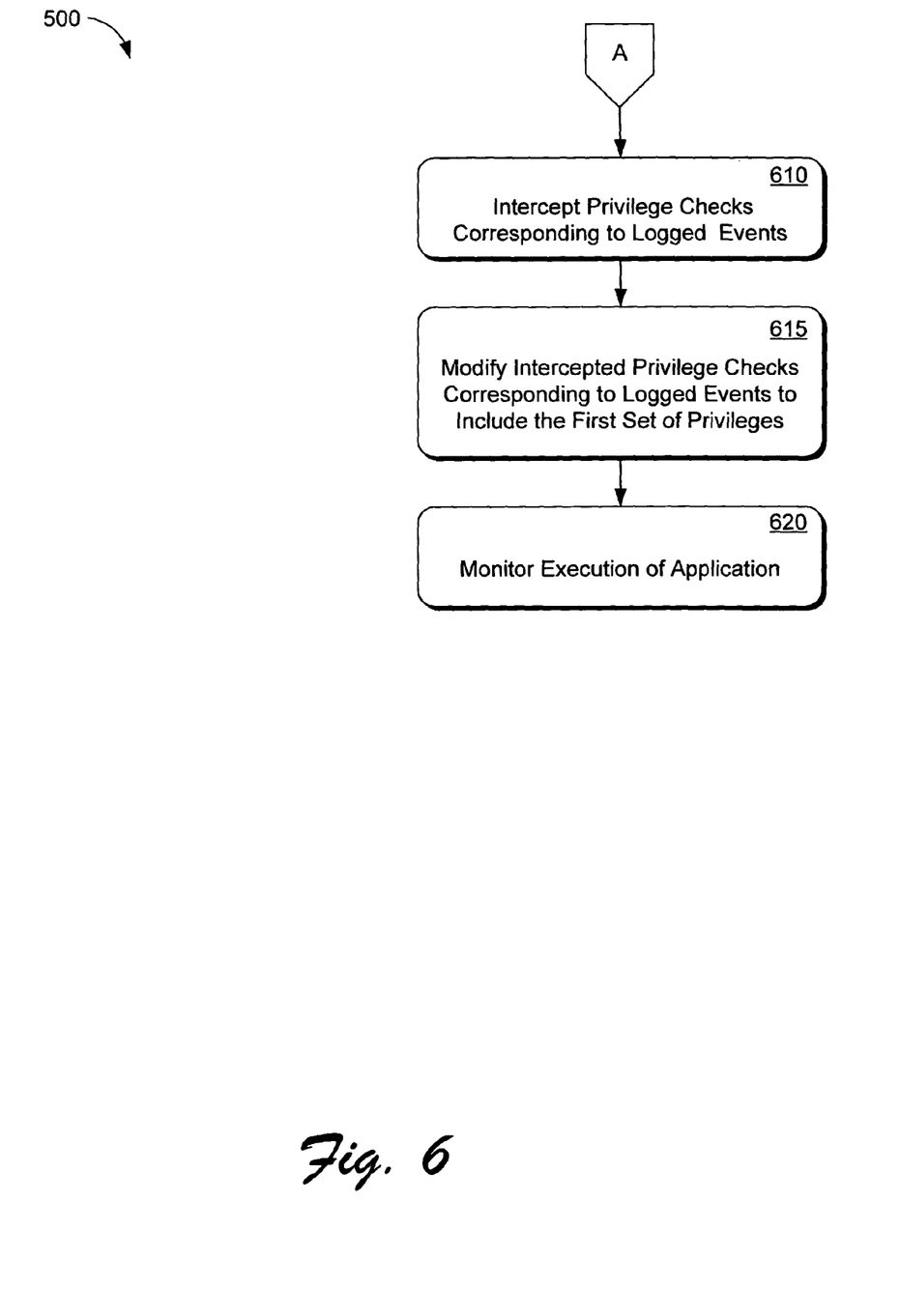

FIGS. 5 and 6 show a method 500 of monitoring privilege checks performed by the security subsystem 210. The method 500 includes a tracing phase and may also include a validation phase. During the tracing phase, the application 210 is run with a first set of privileges. In particular, the security context of a process of the executing application 210 may be embodied in a token that includes the set of privileges. At 510, privilege checks made during execution of the application are monitored. For example, the trace module 220 intercepts the token of the privilege checks 260. The trace module 220 allows the token of the original privilege check 260 to pass through unmodified 260' to the security subsystem 230. The security subsystem 230 compares the privileges in the token to a list of required privileges associated with a particular object or capability. Each required privilege in the list associated with the particular object or capability must be enabled in the token. If all of the privileges in the list are enabled in the token, the security subsystem 230 indicates 270' that the security check passed. If any required privilege is not present and enabled in the token, the security subsystem 230 indicates 270' that the security check failed.

At 515, the results of the privilege checks, having a first set of privileges, are monitored by the trace module 220. If a particular privilege check succeeds with the first of set privileges, the trace module 220 re-submits the privilege check 280 with a second set of privileges, at 520. For example, the trace module 220 modifies the intercepted privilege check to contain a second set of privileges. In one implementation, at least one privilege associated with a privileged group in the first set of privileges is either removed or disabled to form the second set of privileges. For each privilege check that fails the trace module 220 attempts to reacquire the privilege with the current context to deduce if the privilege is available to the current user context and simply not requested. Thereafter, the trace module re-submits 280 the resulting token. The security subsystem 230 compares the privileges of the re-submitted token to a list of required privileges associate with the particular object or capability. If all of the privileges in the list are enabled in the re-submitted token, the security subsystem 230 indicates 290 that the security check passed. If any required privilege associated with the particular object or capability is not present and enabled in the token, the security subsystem 230 indicates 290 that the security check failed.

At 525, the results of the privilege check having a second set of privileges is monitored. If the given privilege check succeeds with the first set of privileges and the modified privilege check fails with the second set of privileges the event is logged, at 530. Each entry in the event log of a failed privilege check may include the current process name, the monitored security checking function, target privileges, the desired access and granted access, a stack dump, the object name and/or other parameters of the current state of execution of the application 210.

During the optional validation phase, the method 500 may include monitoring privilege checks during execution of the application running with the second set of privileges, at 535. Each privilege check corresponding to a particular logged event is intercepted, at 610, and modified to include the first set of privileges, at 615. Execution of the application is monitored, at 620. The application will run correctly if all of the privilege incompatibility events have been identified. Thus, by performing the validation phase one can ensure that all security checks causing privilege incompatibilities have been identified.

Figure 7:
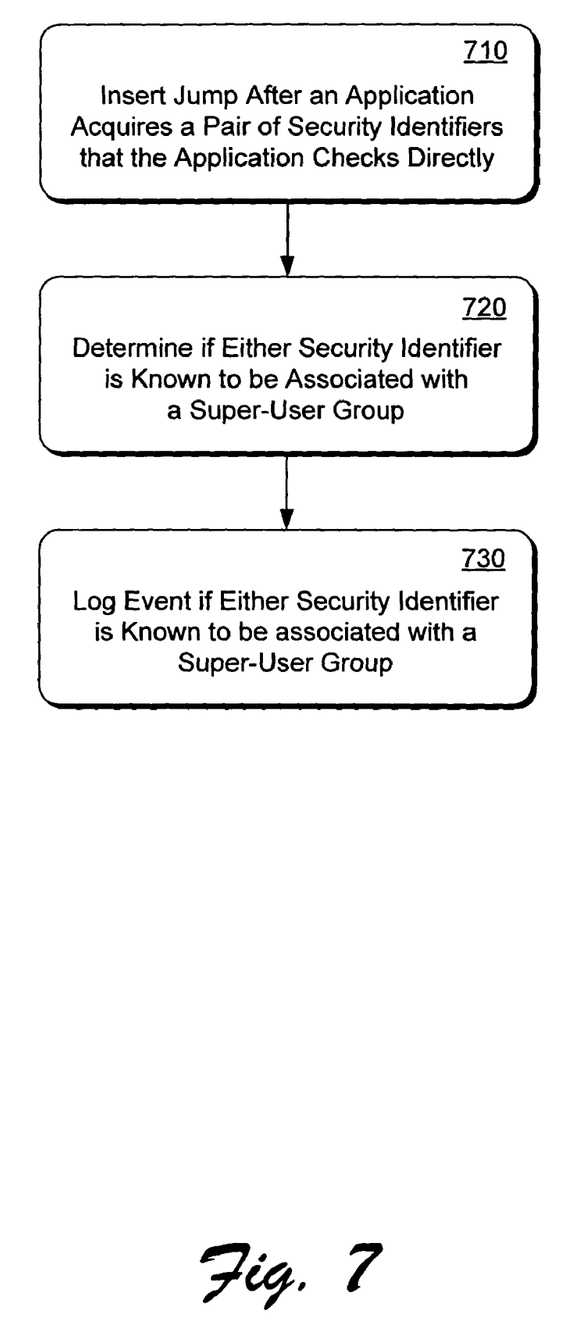
FIG. 7 shows a flow diagram of a method of identifying causes of user/group comparison incompatibilities.

FIG. 7 shows a method 700 of checking user/group identifiers, which an application compares directly. More specifically, an application may check if the user holds a user/group identifier, such as a SID, granting membership to a particular group, and fails if not. The user/group identifiers are checked directly by the application without calling the security subsystem. The user/group identifiers need not necessarily come from a security context or an access control list. For example, the application may obtain a first security identifier from the security context, an access control entry, a text file or the like, and compare it to a second security identifier encoded in the application itself.

The method 700 intercepts such direct application checks and determines if either one of the user/group identifiers is associated with elevated access rights. In one implementation, a jump to the trace module 220 is inserted in the application after a pair of SIDs are acquired, but before the comparison function (e.g., a hard check) is called by the application, at 710. The location for inserting the jump may be determined by identifying direct calls to a function that compares security identifiers. The calls that are nested calls to the security subsystem function, which compares the SIDs to an access control list, are eliminated. The trace module 220 receives the SIDs when the inserted jump is executed and determines if either of the SIDs are known to be associated with a privileged group, at 720. In one implementation, the trace module 220 may pass the SID pair to the SID-compare function in the security subsystem 230 to determine if either of the SIDs are known to be associated with a privileged group. If either of the SIDs possessed by the application are known to be associated with a privileged group, the state of execution of the application is logged, at 730. For example, the current process name, a code pointer to the user/group identifier check function in the application, a stack dump, and/or other parameters of the current state of execution of the application may be stored in the log 240.

Figure 8:
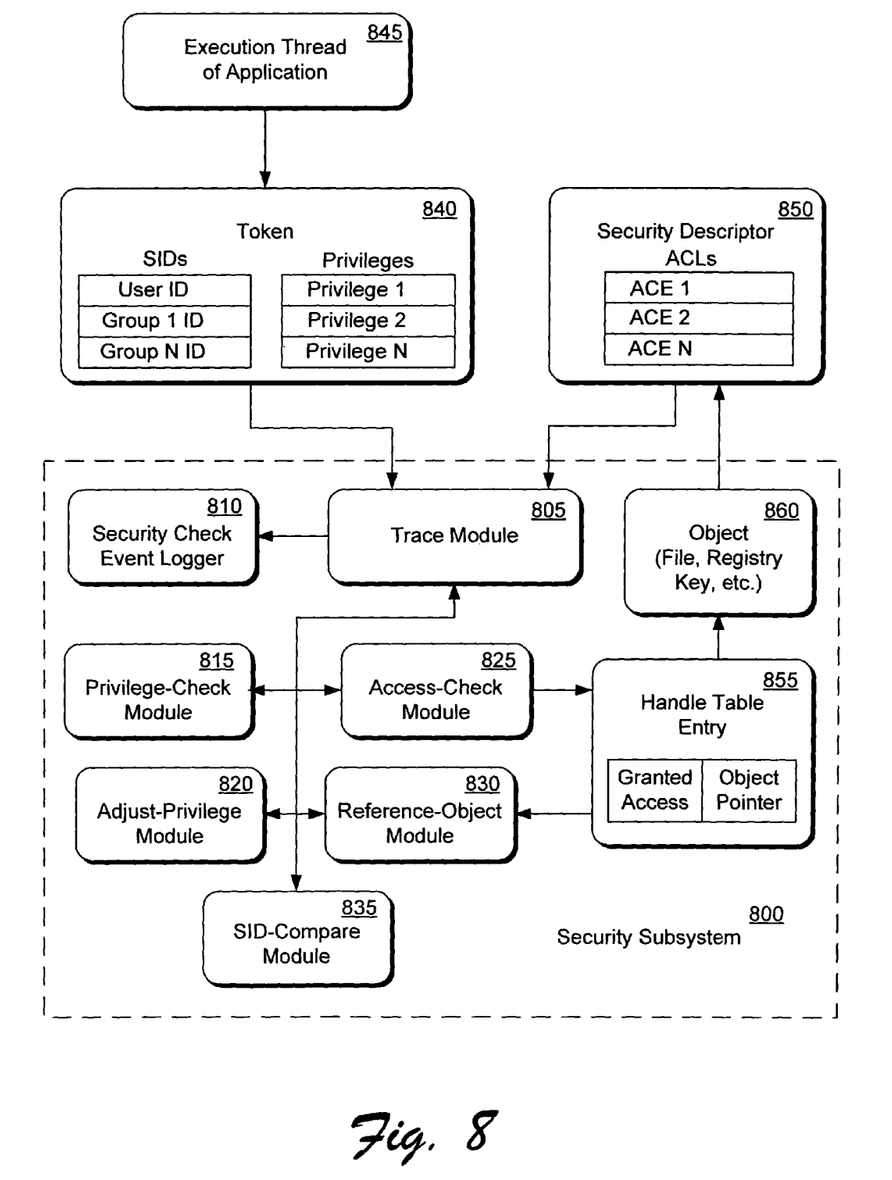
FIG. 8 shows a block diagram of a security subsystem adapted to identify dependencies of an application upon a given security context.

FIG. 8 shows an exemplary security subsystem adapted to identify application dependency upon a given security context. The security subsystem 800 includes a trace module 805 and a security check event logger 810. The trace module 805 monitors security checks generated by a thread of execution of an application 845 and identifies security checks that require elevated rights. The trace module 805 stores a state of execution in the security check event logger 810, if the security check requires elevated rights.

The security subsystem 800 also includes a privilege-check module 815, an adjust-privilege module 820, an access-check module 825, a reference-object module 830 and a SID-compare module 835. The privilege-check module 815 verifies that privileges are held and enabled in a token 840 received from a thread of execution of a given application 845 making a security check call to the security subsystem 800. The adjust-privilege module 820 selectively enables or disables the target privileges. The access-check module 825 verifies whether a user has access to a particular object, as determined by its access control list (ACL) contained in a security descriptor 850. The reference-object module 830 also performs access checks. In particular, read or writes to an object flow through the reference-object function 830, which checks a handle table 855 to determine whether the ability to perform the operation was previously granted by the access-check module 825 when the handle to the object was created. The SID-compare module 835 is used internally by the security subsystem 800 and directly by the application 845 to check if the user holds a security identifier (SID) granting membership in a select group, such as the administrators group, networks operators group, or the like.

In one implementation, the thread of execution of the application 845 passes a token 840 to the security subsystem 800. The token 540 contains a first set of security identifiers (SIDs). One of the SIDs expresses the user's identity, and the rest of the SIDs identify groups that the user belongs to, such as the administrators group or backup operators group. The original token is allowed to pass through unmodified to the access-check module 825 and/or the reference-object module 830. The access-check module 825 verifies whether a user has access to a particular object, as determined by its access control list (ACL) contained in a security descriptor 850.

The access control list (ACL) associated with the object expresses access rights of various users and groups. In a Windows® based system, the ACLs can contain many <SID, access> pairs, as in an Andrew File System (AFS). These <SID, access> pairs are used to grant a user the ability to read and write an object, another user the ability only to read the object, all members of another group the ability to read the object, and the like. ACLs in a Windows®D operating environment can be attached not only to files, but to any object accessible through a handle, such as registry entries and semaphores.

The trace module 505 monitors security checks between the thread of execution 545 and the access-check module 525, reference-object module 530, and/or SID-compare module 535. If a given security check succeeds with the first set of security identifiers, the trace module 505 modifies the token 540 by removing a SID associates with membership in the Administrators group. The modified token is passed to the access-check module 525, reference-object module 530 and/or SID-compare module 535.

The result of the re-submitted security check is monitored to determine if the given security check passes or fails with the subset of security identifiers. If the re-submitted security check fails, the state of execution is logged by the trace module 505 in the security check event logger 510. Each access check log entry indicates the current process name, the monitored security checking function, the desired access and granted access, a stack dump (e.g., the return addresses on the kernel stack), and the object name. The Event Tracing for Windows® (ETW) may be modified to implement the security check event logger 510. The ETW is a kernel component that already allows logging events such as registry accesses, page faults and disk I/O. The ETW may be modified for example to obtain object names of each call to the access-check module 525 by walking back along the kernel stack, traversing function frames. The traversal stops at any function frame that is known to contain object name information, which is then written to the log.

The access check function can be called with an explicit list of desired accesses, such as read and write, or it can be called with a special argument asking for all allowed accesses (e.g., MAXIMUM_ALLOWED). Because administrative privileges grant additional accesses on most objects, it might seem necessary to log most calls asking for all allowed accesses as potential access right incompatibilities. However, this would quickly lead to a large number of false positives when the given application is started, because the access-check module 525 may be called hundreds of times asking for all allowed accesses. A substantial portion of these calls return different accesses based on whether a user has elevated access rights.

Fortunately, the calls to the access-check module 525 asking for all allowed accesses occur during object handle creation. When object handles are created, the accesses granted by the access-check module 525 are cached in a handle table entry 555, and later calls through the reference-object module 530 are compared to the cached accesses. This enables one to avoid the potentially large number of false positives, due to requests for all allowed accesses, by modifying the reference-object module 530. Applying the noise filtering algorithm at the reference-object interface requires maintaining a small amount of additional state information for each object handle. In particular, when object handles are created with the access-check function an additional field in the handle may be initialized to contain the assumed granted access. The assumed granted access indicates the results of the access check for all allowed accesses after removing SIDs associated with super-user groups. When the reference-object module 530 is later called with an object handle, the desired access is compared to both the actual granted accesses and the assumed granted access. The request is then logged if the desired access is allowed by the actual granted accesses and not by the assumed granted access.

In another implementation, privilege checks that require elevated rights are identified. During the privilege check the thread of execution of the application 845 passes a token 840 to the security subsystem 800. The token 840 contains a first set of privileges, such as SystemTime, Shutdown and the like privileges. Each privilege in the token may be enabled or disabled. The original token is allowed to pass through unmodified to the privilege-check module 815 and/or the adjust-privilege module 820. The privilege-check module 815 verifies that privileges are held and enabled in a token 840 received from a thread of execution of a given application 845 making a security check call to the security subsystem 800.

The results of the security checks are monitored to determine if each security check passes or fails with the first set of privileges. For example, the trace module 505 monitors privilege checks between the thread of execution 545 and the privilege-check module 815, and the adjust-privilege module 820. If a given privilege check succeeds with the original set of privileges, the privilege check is resubmitted with a subset of the original set of security identifiers. For example, the trace module 505 modifies the token 540 by removing or disabling a privilege associated with membership in the administrator group. The modified token is passed to the privilege-check module 815 and/or adjust-privilege module 820.

The result of the re-submitted security check is monitored to determine if the given privilege check passes or fails with the subset of privileges. If the re-submitted security check fails, the event is logged. More particularly, the state of execution is logged by the trace module 805 in the security check event logger 810 if the privilege check succeeds with the first set of privileges and the re-submitted security check fails with the second set of privileges. Each privilege check log entry indicates the current process name, the monitored security checking function, the target privileges, a stack dump (e.g., the return addresses on the kernel stack), and the object name.

Accordingly, the original access control checks and privilege checks are first allowed to pass through unmodified. If the security check is successful and the token contains membership in a particular group (e.g., the administrators group), the trace module temporarily removes the membership in the particular group from the token and performs a second security check. Hence, the trace module can be characterized as a conservative noise filtering algorithm. The noise filtering algorithm does not eliminate any true least-right incompatibility events from the log. However the noise filtering algorithm may generate false positives. For example, some applications attempt to acquire objects with rights they do not need, falling back to acquiring the object with fewer rights without any apparent adverse affect.

An optional validation phase may be performed to confirm that all of the access check incompatibilities and/or privilege incompatibilities were detected during the tracing phase. In the validation phase, the application is executed with the second set of security identifiers and/or privileges and the generated security checks are monitored. The security checks corresponding to logged events are intercepted and modified to include the first set of SIDs and/or privileges. The modified security checks having the full set of SIDs and/or privileges are sent in place of the intercepted security check. Accordingly, the application is executed having a security context based on the subset of SID and/or privileges, except for the security checks corresponding to the logged events. As a result, the optional validation phase confirms that all of the access right incompatibilities were detected.

It may be possible to mitigate most or all least-right incompatibilities by using the validation technique to change the outcomes of certain security checks, thus effectively changing ACLs. However, some applications legitimately require Administrative privileges, and the objects they are accessing should retain their strict ACLs. Furthermore, determining whether an application legitimately requires Administrative privileges may be complicated by reasons such as the ACLs belonging to kernel objects whose significance is less clear than files or registry keys. In addition, developers often can change application behavior in any of a number of other ways if an application should not require Administrative privileges. Changing ACLs may require significantly more work than the alternative modifications to application behavior and therefore may not be a method preferred by developers. Furthermore, the architecture of the trace module 805 utilizes a lookup table to determine whether to change the outcome of particular security checks. Accordingly, re-configuring ACLs in place has better scalability and efficiency, avoiding both the lookup step and the need to maintain additional states in the security subsystem. Indeed, this is how ACL modifications are currently handled in the file system and registry.

In yet another implementation, the trace module 805 intercepts direct application checks of security identifiers and determines if the security identifiers are associated with a super-user group. The security identifiers need not necessarily come from a security context or an access control list. The security identifiers may be checked by inserting a jump in the code of the application before an applicable call to a user/group compare function. The location for inserting the jump instruction may be determined by identifying direct calls to a function that compares security identifiers. The SID-compare module 235 may be utilized to determine if any of the SIDs are known to be associated with a privileged group. If any of the SIDs are known to be associated with a super-user group, the state of execution of the executing thread 545 is logged by the security check event logger 510. The corresponding security check log entry indicates the current process name, the monitored SID compare function, the security identifiers, the source of the security identifiers, a stack dump and the like.

Figure 9:
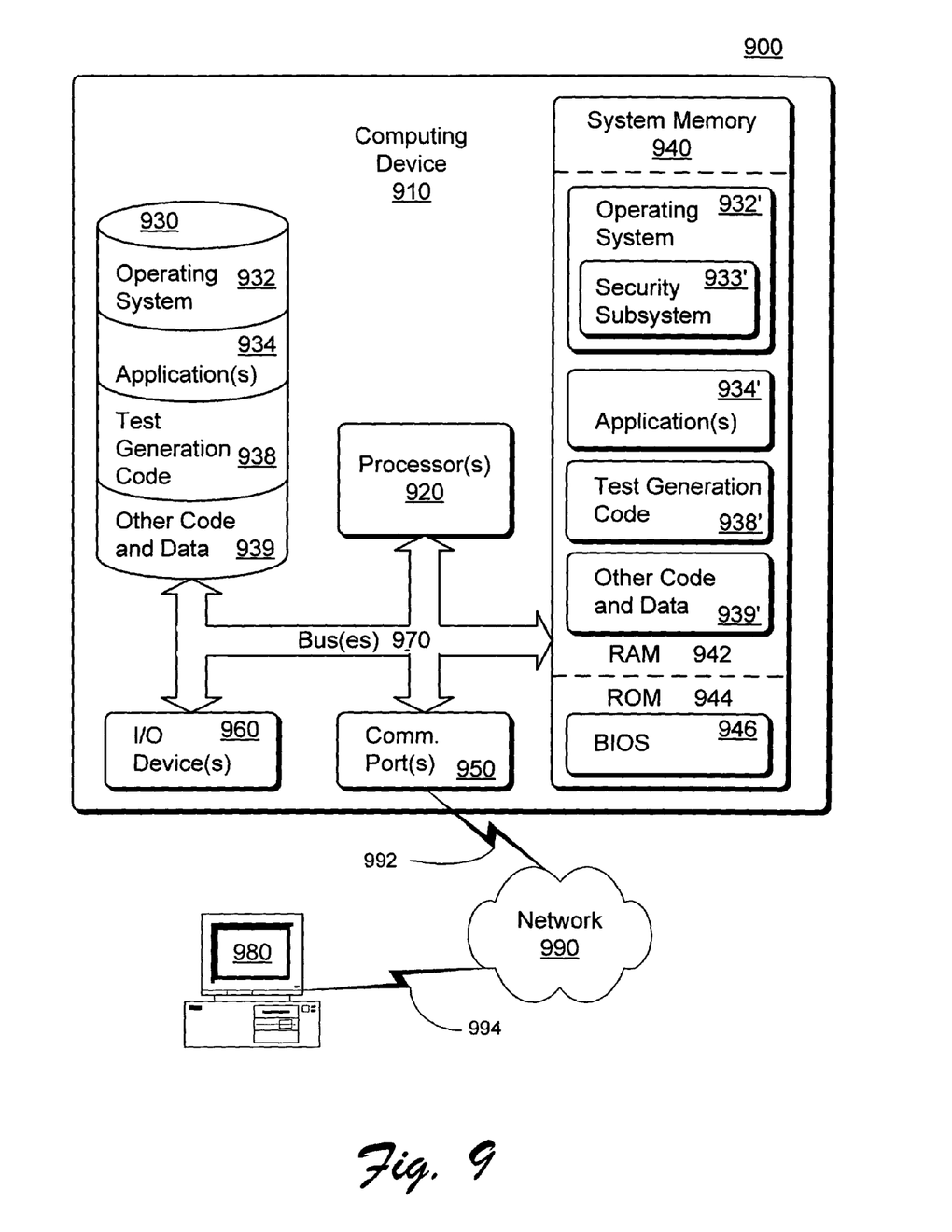
FIG. 9 shows a block diagram of an exemplary operating architecture for implementing a security subsystem adapted to identify dependencies of an application upon a given security context.

FIG. 9 shows an exemplary operating architecture 900 for implementing a security subsystem 933' adapted to identify causes of dependencies of an application upon a given security context. The exemplary operating environment includes a computing device 910. The computing device 910 may be a personal computer, server computer, client computer, handheld or laptop device, minicomputer, mainframe computer, distributed computer system, programmable consumer electronic device and the like.

The computing device 910 may include one or more processors 920, one or more computer-readable media 930, 940 and one or more input/output devices 950, 960. The computer-readable media 930, 940 and input/output devices 950, 960 may be communicatively coupled to the one or more processors 920 by one or more buses 970. The one or more buses 970 may be implemented using any kind of bus architectures or combination of bus architectures, including a system bus, a memory bus or memory controller, a peripheral bus, an accelerated graphics port and/or the like.

The input/output devices 950, 960 may include one or more communication ports 950 for communicatively coupling the computing device 910 to other computing devices 980. One or more other devices 980 may be directly coupled to one or more of the communication ports 950 of the computing device 910. In addition, one or more other devices 980 may be indirectly coupled through a network 990 to one or more of the communication ports 950 of the computing device 910. The networks 990 may include an intranet, an extranet, the Internet, a wide-area network (WAN), a local area network (LAN), and/or the like. The communication ports 950 of the computing device 910 may include any type of interface, such as a network adapter, modem, radio transceiver, or the like. The communication ports 950 may implement any connectivity strategies, such as broadband connectivity, modem connectivity, digital subscriber link (DSL) connectivity, wireless connectivity or the like.

The computing device 910 may also include additional input/output devices 960, such as one or more display devices, keyboards, and pointing devices (e.g., a "mouse"). The input/output devices 960 may further include one or more speakers, microphones, printers, joysticks, game pads, satellite dishes, scanners, card reading devices, digital cameras, video cameras or the like. The input/output devices 960 may be coupled to the bus 970 through any kind of input/output interface and bus structures, such as a parallel port, serial port, game port, universal serial bus (USB) port, video adapter or the like.

The computer-readable media 930, 940 may include system memory 940 and one or more mass storage devices 930. The mass storage devices 930 may include a variety of types of volatile and non-volatile media, each of which can be removable or non-removable. For example, the mass storage devices 930 may include a hard disk drive for reading from and writing to non-removable, non-volatile magnetic media. The one or more mass storage devices 930 may also include a magnetic disk drive for reading from and writing to a removable, non-volatile magnetic disk (e.g., a "floppy disk"), and/or an optical disk drive for reading from and/or writing to a removable, non-volatile optical disk such as a compact disk (CD), digital versatile disk (DVD), or other optical media. The mass storage devices 930 may further include other types of computer-readable media, such as magnetic cassettes or other magnetic storage devices, flash memory cards, electrically erasable programmable read-only memory (EEPROM), or the like. Generally, the mass storage devices 930 provide for non-volatile storage of computer-readable instructions, data structures, program modules, code segments, and other data for use by the computing device 910. For instance, the mass storage device 930 may store the operating system 932, one or more applications 934, test generation code 938 and other code and data 939. The data structures, program modules, code segments and other data for identifying dependencies of an application 934 upon a given security context may be integrated in the security subsystem 933' of the operating system 932. Alternatively, data structures, program modules, code segments and other data for identifying causes of access rights incompatibility may be an independent evaluation tool and stored as separate code and data 939.

The system memory 940 may include both volatile and non-volatile media, such as random access memory (RAM) 942, and read only memory (ROM) 944. The ROM 944 typically includes a basic input/output system (BIOS) 946 that contains routines that help to transfer information between elements within the computing device 910, such as during startup. The BIOS 946 instructions executed by the processor 920, for instance, causes the operating system 932 to be loaded from a mass storage device 930 into the RAM 942. The BIOS 946 then causes the processor 920 to begin executing the operating system 932' from the RAM 942. A given application 934 may then be loaded into the RAM 942 under control of the operating system 932'. Test generation code 939 for controlling execution of the given application 934 may also be loaded into the RAM 942 under control of the operating system 932'.

The processor 920 of the computing device 910 executes the various instructions of the given application 934' in conjunction with the test generator code 938'. The test generation code 938' may be utilized to exercise all or a select set of the routines of the application 934'. The application 934' is run in a tracing phase with a given security context. The security context is an instance of a user having a given subset of security parameters. The security checks generated by the application 934' are monitored by the trace module of the security subsystem 933'. The trace module identifies security checks that require elevated rights. The elevated rights may correspond to security identifiers (SID), privileges, or the like, that are associated with a privileged user or group such as an administrator group, network administrator group, local administrator group, backup operators group, supervisory group, power users group, root, super-user or the like.

Monitoring security checks generated by the application 634' and identifying security checks that require elevated rights may include: a) monitoring access control checks performed by the security subsystem 933'; b) monitoring privilege checks performed by the security subsystem 933'; and/or c) checking access identifiers, which the application 934' checks directly, against a list of known identifiers associated with elevated rights. When determining access right incompatibilities, if an access check having a given set of security identifiers passes, the security check is resubmitted by a trace module of the security subsystem 933' with a subset of the original security identifiers. Access checks that pass with the given set of security identifiers but fail with a subset of the security identifiers are logged. The application 934' may then be run in a validation phase with the second set of security identifiers. In the validation phase, the access checks corresponding to the logged access right incompatibility events are modified to include all of the given set of security identifiers. The application will only run correctly if all of the access right incompatibility events have been identified and modified to support the required access.

When determining privilege incompatibilities, if a privilege check having a given set of privileges passes, the security check is resubmitted by the trace module with a subset of the privileges. Privilege checks that pass with the given set of privileges but fail with a subset of the privileges are logged.

The application 934' may then be run in a validation phase with the subset of privileges. In the validation phase, the privilege checks corresponding to the logged privilege incompatibility events are modified to include all of the given set of privileges. The application will only run correctly if all of the privilege incompatibility events have been identified and modified to support the required access.

When determining causes of user/group comparison incompatibilities a jump is inserted before a direct call to a function that compares user/groups identifiers directly by the application. Upon execution of the jump to the trace module, the user/group identifiers are checked against known identifiers associated with privileged groups requiring elevated rights. If any of the user/group identifiers are known to be associated with a privileged group the state of execution of the application is logged In one implementation, the given application 934' may be a video game, document processing application, software development tool or the like. The logged access control incompatibility events may identify security checks associated with overly restrictive ACLs. For example, the given application may unnecessarily require elevated rights because settings are stored in a more secure location than necessary or did not correctly configure ACLs to allow access by the appropriate user. The application dependency may be fixed with small code changes and/or it may be possible to work around them by manually reconfiguring the relevant ACLs.

In another implementation, the given application 634' may be a utility program or the like. The logged privilege incompatibility events may identify security checks associated with insufficient granularity in application design. For example, the given application may provide some functionality appropriate for all users and some functionality that should only be usable with administrative privileges. The application dependency upon elevated rights may be fixed such that functionalities appropriate for all users do not require privileges associated with a privileged group.

In yet another implementation, the given application 634' may be a video game, document processing application or the like. The logged events may identify security checks associated with programmatic enforcement of unnecessary access right requirements. More specifically, the program may require elevated rights even though the application functions if the initial security checks are bypassed.

The above-described techniques for identifying dependencies of an application upon a given security context advantageously reduce the time to fix such dependencies. The techniques allow a single test pass to produce a list of all the dependencies in the exercised code paths and to provide additional information beyond the source line at which the security checks fail. The techniques may provide the source lines, object names, access control lists, call stacks and the like. The information may be utilized by application developers to identify and understand an application's dependency upon a given security context. The information is also useful to developers who need to modify code written by others, where they have no a priori insight into failing security checks. In addition, the information is useful when analyzing opaque failures such as when libraries and other software components encapsulate the failing system calls, and/or the code is only available in binary form.

The techniques for identifying dependencies of an application upon a given security context may also be utilized by system administrators to mitigate some incompatibilities through system policy changes. The techniques enable faster identification of both the relevant ACLs and other causes of incompatibilities, such as missing named privileges. With such information, system administrators can more readily make changes to relevant ACLs and/or modify the system policy so that applications can run with a reduced set of rights. Finally, it is appreciated that the security checks are a tiny fraction of a system's performance. Thus the overhead added by the techniques, which in the worst case is proportional to duplicating all security checks, is negligible.

Although embodiments of techniques for identifying dependencies of an application upon a given set of rights have been described in language specific to structural features and/or methods, it is to be understood that the subject of the appended claims is not necessarily limited to the specific features or methods described. Rather, the specific features and methods are disclosed as exemplary implementations of techniques for identifying dependencies of an application upon a given security context.

What is claimed is:

1. A computer-implemented method comprising computer-executable instructions for identifying application dependency upon a security context comprising:
    monitoring, by a computing device, execution of an application;
    identifying a comparison of a plurality of security identifiers performed by the application for permitting the execution of the application during the execution of the application, the plurality of security identifiers including user identifiers or group identifiers, wherein at least one of the plurality of security identifiers is not obtained by the application from the security context or from an access control list;
    checking the plurality of security identifiers in the comparison against a list of known identifiers that are associated with elevated rights to identify one or more elevated rights identifiers;
    reconfiguring the application to permit the execution of the application without the one or more elevated rights identifiers; and
    logging a state of execution of the application if at least one of the plurality of security identifiers is associated with elevated rights.

2. A method of according to claim 1, wherein execution of the application comprises exercising a select set of routines.

3. A method according to claim 1, wherein the state of execution of the application comprises one or more parameters selected from a group consisting of a current process name, each of the plurality of identifiers, a code pointer to a user/group identifier check function in the application and a stack dump.

4. A computing device comprising:
    a memory;
    one or more processors coupled to the memory, wherein the one or more processors are configured to execute:
    an application;
    a security subsystem; and
    a trace module, communicatively coupled between the application and the security subsystem to:
    insert a jump instruction to the trace module in the application before the application calls a user/group identifier comparison function;
    execute the jump instruction during execution of the application to receive one or more security identifiers to be compared by the user/group identifier comparison function at the trace module, wherein the one or more security identifiers are not obtained by the application from the security context or from an access control list; and
    determine whether the one or more security identifiers are associated with elevated rights by checking the one or more security identifiers via the user/group identifier comparison function, each of the one or more security identifiers being a user identifier or a group identifier; and
    an event logger to store a state execution for each of the one or more security identifiers that is associated with elevated rights in a computer-readable log.

5. A computing device of claim 4, further comprising a test generation module to control execution of the application.

6. A computing device of claim 4, wherein the identifier is encoded directly in the application.

7. One or more computer-readable storage media having instructions that, when executed on one or more processors, perform acts comprising:
    monitoring access checks generated by a security subsystem during execution of an application run with a first set of security identifiers using a trace module that is communicatively coupled between the application and the security subsystem via a jump instruction inserted into the application, wherein at least one of the first set of security identifiers is not obtained by the application from the security context or from an access control list;
    re-submitting an access check with a second set of security identifiers if the access check succeeds with the first set of security identifiers, the second set of security identifiers being a subset of the first set of security identifiers that excludes at least one security identifier of the first set;
    receiving a result of the access check re-submitted with the second set of security identifiers; and
    logging an event if the access check succeeds with the first set of security identifiers and fails with the second set of security identifiers.

8. One or more computer-readable storage media according to claim 7, wherein the first set of security identifiers is associated with a privilege group.

9. One or more computer-readable storage media according to claim 7, wherein logging the event comprises storing one or more parameters selected from the group consisting of a current process name, a monitored security identifier checking function, the security identifier, a source of the security identifier, a stack dump.

10. One or more computer-readable storage media according to claim 7, further comprising modify the access check corresponding to the logged event to include the first set of identifiers and re-monitor the access check during another execution of the application.

11. One or more computer-readable storage media according to claim 10, wherein:
    the first set of security identifiers includes one or more identifiers of privileged groups; and
    the second set of security identifiers excludes at least one of the one or more identifiers of privileged groups.

* * * * *